United States Patent [19]
Remmerfelt et al.

[11] Patent Number: 4,534,241
[45] Date of Patent: Aug. 13, 1985

[54] CRANKSHAFT FOR COMBUSTION ENGINES

[75] Inventors: Arne Remmerfelt; Sten Larsson, both of Skövde, Sweden

[73] Assignee: AB Volvo, Goteborg, Sweden

[21] Appl. No.: 503,193

[22] PCT Filed: Oct. 7, 1982

[86] PCT No.: PCT/SE82/00323
  § 371 Date: Jun. 2, 1983
  § 102(e) Date: Jun. 2, 1983

[87] PCT Pub. No.: WO83/01283
  PCT Pub. Date: Apr. 14, 1983

[30] Foreign Application Priority Data

Oct. 8, 1981 [SE] Sweden .................... 8105965

[51] Int. Cl.³ ............... F16C 3/10; F16C 3/14
[52] U.S. Cl. ...................... 74/597; 74/605; 29/6
[58] Field of Search ............ 74/595, 596, 597, 605; 29/445, 6

[56] References Cited

U.S. PATENT DOCUMENTS

| | | | |
|---|---|---|---|
| 2,109,526 | 3/1938 | Fell | 74/597 |
| 2,256,726 | 9/1941 | Rippingille | 29/6 |
| 3,309,941 | 3/1967 | Kappel | 74/597 |
| 3,704,636 | 12/1972 | Piech | 29/6 |
| 3,748,925 | 7/1973 | Stewart | 74/597 |
| 3,768,335 | 10/1973 | Mayer | 74/597 |
| 3,772,763 | 11/1973 | Henson et al. | 29/6 |

FOREIGN PATENT DOCUMENTS

| | | | |
|---|---|---|---|
| 0107112 | 8/1980 | Japan | 29/6 |
| 0103750 | 6/1982 | Japan | 29/6 |

Primary Examiner—Kenneth J. Dorner
Assistant Examiner—Vinh Luong
Attorney, Agent, or Firm—Young & Thompson

[57] ABSTRACT

A crankshaft for combustion engines has a number of components joined to each other. Each component comprises a counterweight, a portion of a main bearing journal, and a portion of a crank bearing journal. Adjacent components are so arranged that their crank bearing journal portions are connected to each other to form a complete crank bearing journal, and their main bearing journal portions are secured to each other to form a complete main bearing journal. One of each pair of portions is longer than the other; and oil ducts extend through cavities in the components but do not communicate with those cavities. Instead, the ends of the ducts open through the journal bearing surfaces, and specifically through the longer of the two journal portions so that the opening of the ducts can be central of the journal and still not interfere with the joint between the components.

5 Claims, 8 Drawing Figures

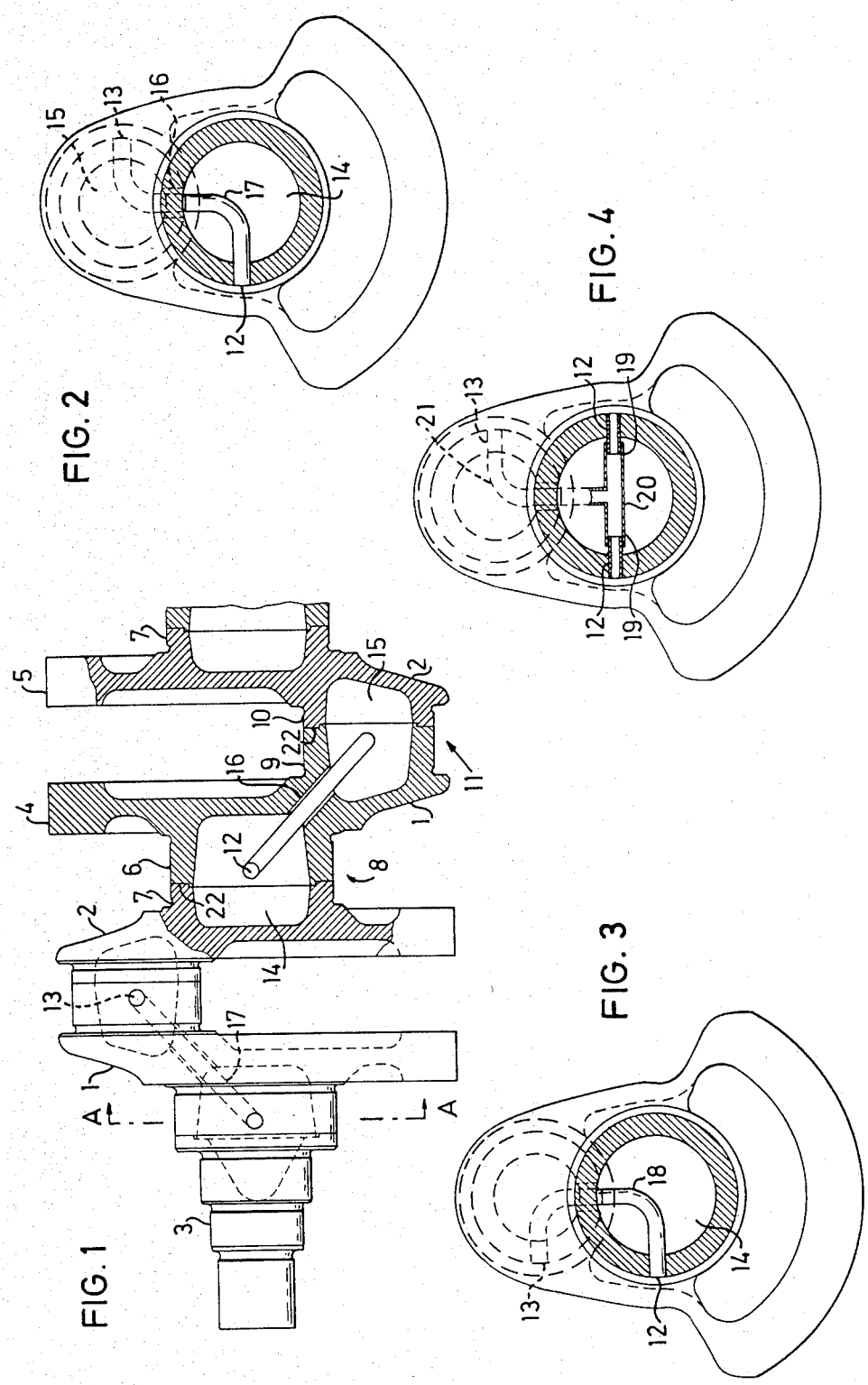

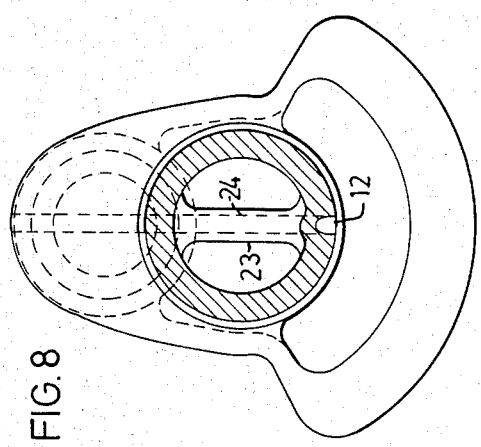
FIG.8
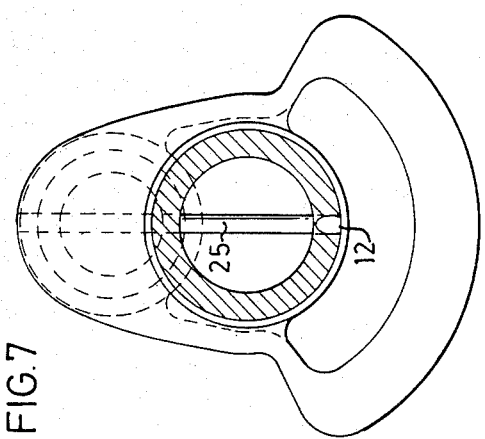
FIG.7
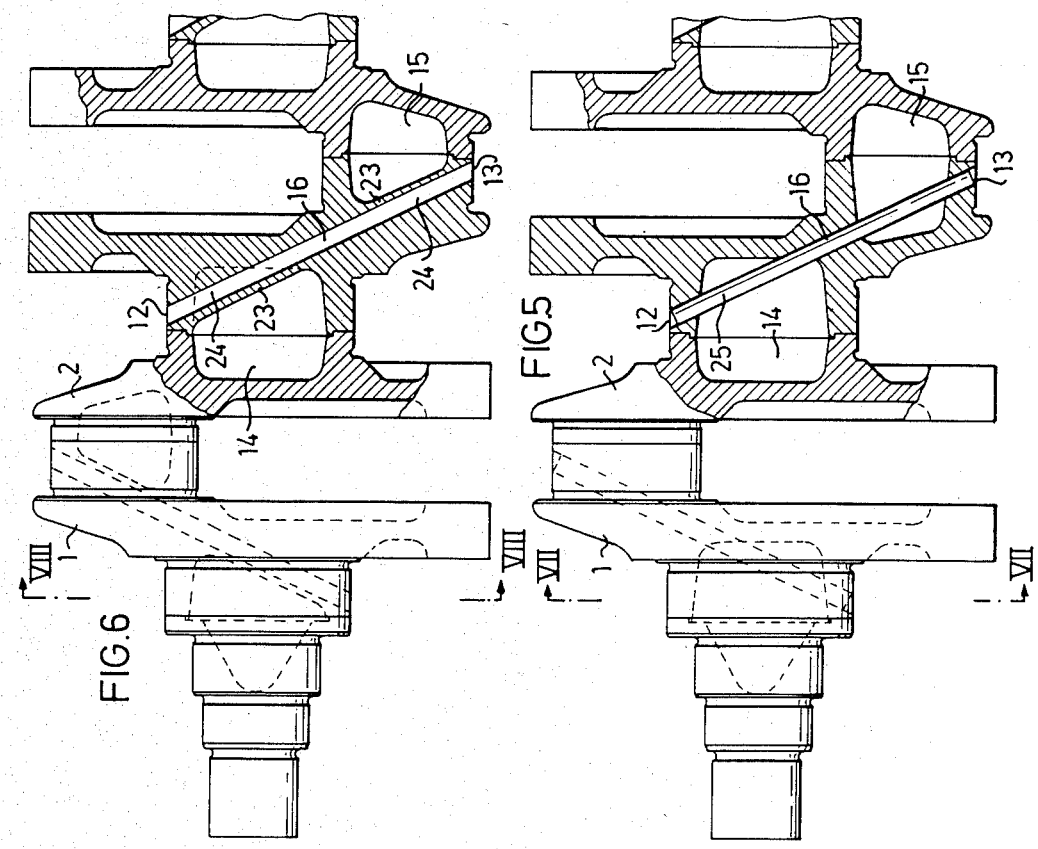
FIG.6
FIG.5

CRANKSHAFT FOR COMBUSTION ENGINES

The present invention relates to a crankshaft for combustion engines, comprisng a number of components made with cavities and joined to each other so as to form together main bearing journals, crank bearing journals and counterweights.

It is known to manufacture cranshafts with a number of components with cavities, which are joined together by welding into a complete crankshaft. The components can be preworked to such a degree that only heat treatment and final grinding is required after the welding operation. A crankshaft of this type has several advantages over a conventional homogeneous crankshaft. If the components are forged with cavities which provide an optimum ratio between weight and strength, the weight of the crankshaft can be reduced by about 30–35% in comparison to a conventional crankshaft. Furthermore, both the production of blanks and the machining can be done with simpler and less expensive machines, and furthermore with an appreciably higher degree of automation. The same blanks and machined components can be used for crankshafts in engines with different numbers of cylinders, which further contributes to reducing production costs.

In order to make it possible to exploit the above-mentioned advantages, the oil supply to the bearings must be solved in a satisfactory manner. The problem is that it is difficult to assure that the cavities in the bearing journals will be completely free of contaminants such as shavings, slag or sand from the casting molds. If the oil is permitted to pass through the cavities and out through bores in the bearing journals, there will be the risk that contaminants are carried with the oil to the bearings, possibly destroying them.

One purpose of the present invention is to solve the problem of lubrication and yet retain the possibility described above of preprocessing the components to such a degree that only heat treatment and final polishing remain after welding.

This is achieved according to the invention in that each of the components is made with a portion of a main bearing journal and a portion of a crank bearing journal, and that journal portions joined together form closed cavities in both the main bearing journals and the crank bearing journals, one of two components joined to each other having longer journal portions than the other component and having at least one oil duct delimited from the cavities and extending between the journal portions and opening at their lateral surfaces.

This construction prevents the oil from entering the cavities and carrying contaminants to the bearings, the difference in length of the bearing journal portions on the components making it possible, prior to assembly, to provide one of the components with oil ducts, which after assembly open centrally on the bearing journals and assure an evenly distributed supply of oil to the bearings.

The invention will be described below with reference to examples shown in the accompanying drawings.

FIG. 1 shows a side view, partially in section, of a portion of a crankshaft according to the invention, FIGS. 2–4 show three different embodiments of one of the components in section along the line A—A in FIG. 1, FIGS. 5 and 6 show side views, partially in section, of two additional embodiments, and FIGS. 7 and 8 show cross sections along the line VII—VII and VIII—VIII in FIGS. 5 and 6.

The crankshaft shown in FIG. 1 is made of a number, dependent on the number of cylinders, of pairs of components 1 and 2 and end journals 3. Each component 1 and 2 has, in addition to a counterweight 4 or 5 respectively, a portion 6 or 7 respectively of a hollow main bearing journal 8 and a portion 9 or 10 respectively of a hollow crank bearing journal 11. The bearing journal portions 6 and 9 of component 1 are longer than the bearing journal portions 7 and 10 of component 2 and are provided with radial bores 12, 13 which open into cavities 14, 15 in the bearing journals. By virtue of the fact that the joint between two components 1 and 2 are thus asymmetrical, the bores can be placed in the center of the journals, which is advantageous to achieve an even distribution of lubricating oil to the bearings.

In the components 1, ducts 16 are drilled which connect the cavities 14, 15 to each other. In the embodiments in FIGS. 2 and 3, each main bearing journal is provided with a bore 12, and an S or U-shaped steel tube 17 or 18 extends through the duct 16 and is sealingly joined to the edges of the bores 12, 13. In the embodiment in FIG. 4, the main bearing journals have two bores 12 which communicate with the bore 13 via a pair of tube branches 9, a T-connection 20 and an L-shaped tube 21, which are sealingly joined to each other. A tight joint between the tubes and the edges of the bores can be obtained by pressure-rolling or folding of the tube ends. Alternatively, they can be welded, soldered or glued to the edges of the bores. An intermediate sealing member can possibly be used.

FIGS. 5 and 7 show a simplified embodiment in which the oil duct is formed by a completely straight tube 25, which lies in the plane of symmetry of the components. The advantage of this arrangement is that the bores 12, 13 and the duct 16 can be drilled in a single work step and that the mounting of the tube 25 will be simple.

FIGS. 6 and 8 show a similar embodiment, but here the tube has been entirely eliminated and instead the respective cavity 14, 15 is made with a flange or ridge 23 which projects into the cavity from one end wall and in which a bore 24 extends. The bores 24 form unbroken transitions between the bores 12, 13 in the bearing journal wall and the bore 16 in the intermediate wall. As in the immediately preceding example, this permits the bore to be drilled in a single step.

After machining and completion of the oil ducts, the required number of components 1 and 2 and two end members 3 are pressed together to form a complete crankshaft, whereafter the jointing can be done. Preferably, the components are welded together by electron-beam welding, which produces an exact welding joint without deformation and can be controlled so that the structure of the material will remain essentially unchanged. Other joining methods can also be used such as laser welding, soldering or gluing. Furthermore, other materials than steel, e.g. plastic, can be used in the tubes. To facilitate the joining together (the welding) and to obtain good precision, the bearing journals are made with guides 22, so that the shaft can be peassembled with pressure means prior to the final jointing.

We claim:

1. A crankshaft for combustion engines, comprising a plurality of components joined together so as to form together main bearing journals, crank bearing journals and counterweights, each component having a portion of a main bearing journal and a portion of a crank bearing journal, the main bearing journal portions of two adjacent components being secured together to form a complete main bearing journal and the crank bearing journal portions of two adjacent components being joined together to form a complete crank bearing journal, said joined-together journal portions defining between them closed cavities in both the main bearing journal and the crank bearing journal, one said portion of each pair of joined-together journal portions being longer than the other, and an oil duct passing through said cavities but sealed from communication with said cavities and having open ends that open through the bearing surfaces of the longer ones of said journal portions.

2. A crankshaft as claimed in claim 1, in which said oil duct is a separate tube member which extends through said cavities and through a bore in a wall between said cavities.

3. A crankshaft as claimed in claim 2, in which said tube member is a straight tube lying in a plane of symmetry of said components.

4. A crankshaft as claimed in claim 1, in which said oil duct is a bore that extends through a flange located in said cavities in a plane of symmetry of said components.

5. A crankshaft as claimed in claim 1, in which said open ends of said oil ducts are disposed in the centers of said bearing journals so as to achieve an even distribution of lubricating oil to said bearing journals.

* * * * *